(12) United States Patent
Aota et al.

(10) Patent No.: US 8,303,452 B2
(45) Date of Patent: Nov. 6, 2012

(54) AUTOMATIC TRANSMISSION

(75) Inventors: Kazuaki Aota, Sagamihara (JP); Takashi Fujioka, Yokohama (JP); Naoki Kobayashi, Machida (JP); Kazuo Oguri, Hiroshima (JP); Takeo Hiramatsu, Nagaokakyo (JP)

(73) Assignee: Jatco Ltd, Fuji-shi (JP)

( * ) Notice: Subject to any disclaimer, the term of this patent is extended or adjusted under 35 U.S.C. 154(b) by 290 days.

(21) Appl. No.: 12/745,199

(22) PCT Filed: Nov. 14, 2008

(86) PCT No.: PCT/JP2008/070735
§ 371 (c)(1),
(2), (4) Date: Jul. 27, 2010

(87) PCT Pub. No.: WO2009/069477
PCT Pub. Date: Jun. 4, 2009

(65) Prior Publication Data
US 2010/0311536 A1  Dec. 9, 2010

(30) Foreign Application Priority Data

Nov. 29, 2007  (JP) ................................ 2007-309534
Feb. 14, 2008  (JP) ................................ 2008-032669

(51) Int. Cl.
*F16H 3/62* (2006.01)
(52) U.S. Cl. ........................................ 475/275; 475/323
(58) Field of Classification Search ........... 475/269–330
See application file for complete search history.

(56) References Cited

U.S. PATENT DOCUMENTS

| | | | |
|---|---|---|---|
| 4,985,011 A | 1/1991 | Asada et al. | |
| 5,049,116 A | 9/1991 | Asada | |
| 6,514,170 B1 | 2/2003 | Kao et al. | |
| 2005/0215383 A1* | 9/2005 | Usoro et al. | 475/288 |
| 2007/0060438 A1 | 3/2007 | Fukuyama et al. | |

FOREIGN PATENT DOCUMENTS

| | | |
|---|---|---|
| JP | 2671463 B2 | 7/1997 |
| JP | 2890498 B2 | 2/1999 |
| JP | 2004-084774 A | 3/2004 |
| JP | 2004-176765 A | 6/2004 |
| WO | WO 2005/026579 A1 | 3/2005 |

* cited by examiner

*Primary Examiner* — Justin Holmes
(74) *Attorney, Agent, or Firm* — Foley & Lardner LLP

(57) ABSTRACT

An automatic transmission includes a first planetary gear set including first to third rotating elements; a second planetary gear set including fourth to sixth rotating elements; a third planetary gear set including seventh to sixth to ninth rotating elements; an input shaft constantly connected with the first rotating element; an output shaft constantly connected with the second rotating element; and at least five friction elements including a first friction element capable of locking a rotation of the eighth rotating element, a second friction element configured to selectively connect the second rotating element with the fifth rotating element, a third friction element configured to selectively connect the second rotating element with a second rotating member defined by the sixth and seventh rotating elements, a fourth friction element configured to selectively connect the fifth rotating element with the eighth rotating element, and a fifth friction element configured to selectively connect the first rotating element with the fifth rotating element. The automatic transmission achieves each of at least seven forward speed-ratios and one reverse speed-ratio, by a concurrent engagement of two friction elements which are selected from the five friction elements.

7 Claims, 8 Drawing Sheets

$\rho_1 = Z_{S1}/Z_{R1} = 0.5$     $\rho_2 = Z_{S2}/Z_{R2} = 0.55$     $\rho_3 = Z_{S3}/Z_{R3} = 0.55$

| GEAR | A | B | C | D | E | FORMULA OF REDUCTION GEAR RATIO $i = n_T/n_2$ | REDUCTION GEAR RATIO | 1/REDUCTION GEAR RATIO |
|---|---|---|---|---|---|---|---|---|
| FIRST SPEED | ○ | ○ | | | | $i_1 = (1 + \rho_1 + \rho_3 + \rho_2 \rho_3) / \rho_1$ | 4.705 | 0.213 |
| SECOND SPEED | ○ | | ○ | | | $i_2 = (1 + \rho_1 + \rho_3) / \rho_1$ | 4.100 | 0.244 |
| THIRD SPEED | ○ | | | ○ | | $i_3 = (1 + \rho_1) / \rho_1$ | 3.000 | 0.333 |
| FOURTH SPEED | | | ○ | ○ | | $i_4 = (\rho_1 + \rho_3) / \rho_1$ | 2.100 | 0.476 |
| FIFTH SPEED | | ○ | | | ○ | $i_5 = (\rho_1 + \rho_2 \rho_3) / \rho_1$ | 1.605 | 0.623 |
| SIXTH SPEED | | | | ○ | ○ | $i_6 = (1 + \rho_1) / (1 + \rho_1 - \rho_2 \rho_3)$ | 1.253 | 0.798 |
| SEVENTH SPEED | | | | | ○ | $i_7 = 1.0$ | 1.000 | 1.000 |
| EIGHTH SPEED | | | ○ | | ○ | $i_8 = 1/(1 + \rho_2)$ | 0.645 | 1.550 |
| REVERSE | ○ | | | | ○ | $i_R = -(1 + \rho_1)/(\rho_3(1 + \rho_2) - \rho_1)$ | -4.255 | -0.235 |

RATIO COVERAGE: 7.29     (R/1) = 0.904

$\rho_1 = Z_{S1}/Z_{R1} = 0.5$  $\rho_2 = Z_{S2}/Z_{R2} = 0.55$  $\rho_3 = Z_{S3}/Z_{R3} = 0.55$

| GEAR | A | B | C | D | E | FORMULA OF REDUCTION GEAR RATIO i = $n_T/n_2$ | REDUCTION GEAR RATIO | 1/REDUCTION GEAR RATIO |
|---|---|---|---|---|---|---|---|---|
| FIRST SPEED | ○ | ○ | | | | $i_1 = (1 + \rho_1 + \rho_3 + \rho_2 \rho_3) / \rho_1$ | 4.705 | 0.213 |
| SECOND SPEED | ○ | | ○ | | | $i_2 = (1 + \rho_1 + \rho_3) / \rho_1$ | 4.100 | 0.244 |
| THIRD SPEED | ○ | | | ○ | | $i_3 = (1 + \rho_1) / \rho_1$ | 3.000 | 0.333 |
| FOURTH SPEED | | | ○ | ○ | | $i_4 = (\rho_1 + \rho_3) / \rho_1$ | 2.100 | 0.476 |
| FIFTH SPEED | | ○ | | ○ | | $i_5 = (\rho_1 + \rho_2 \rho_3) / \rho_1$ | 1.605 | 0.623 |
| SIXTH SPEED | | | | ○ | ○ | $i_6 = (1 + \rho_1) / (1 + \rho_1 - \rho_2 \rho_3)$ | 1.253 | 0.798 |
| SEVENTH SPEED | | ○ | | | ○ | $i_7 = 1.0$ | 1.000 | 1.000 |
| REVERSE | ○ | | | | ○ | $i_R = -(1 + \rho_1) / (\rho_3 (1 + \rho_2) - \rho_1)$ | -4.255 | -0.235 |

RATIO COVERAGE: 4.705  (R/1) = 0.904

FIG.6

$\rho_1 = Z_{S1}/Z_{R1} = 0.5$   $\rho_2 = Z_{S2}/Z_{R2} = 0.55$   $\rho_3 = Z_{S3}/Z_{R3} = 0.55$

| GEAR | A | B | C | D | E | FORMULA OF REDUCTION GEAR RATIO $i = n_T/n_2$ | REDUCTION GEAR RATIO | 1/REDUCTION GEAR RATIO |
|---|---|---|---|---|---|---|---|---|
| FIRST SPEED | ○ |   | ○ |   |   | $i_1 = (1 + \rho_1 + \rho_3)/\rho_1$ | 4.100 | 0.244 |
| SECOND SPEED | ○ |   |   | ○ |   | $i_2 = (1 + \rho_1)/\rho_1$ | 3.000 | 0.333 |
| THIRD SPEED |   |   | ○ | ○ |   | $i_3 = (\rho_1 + \rho_3)/\rho_1$ | 2.100 | 0.476 |
| FOURTH SPEED |   | ○ |   | ○ |   | $i_4 = (\rho_1 + \rho_2 \rho_3)/\rho_1$ | 1.605 | 0.623 |
| FIFTH SPEED |   |   |   | ○ | ○ | $i_5 = (1 + \rho_1)/(1 + \rho_1 - \rho_2 \rho_3)$ | 1.253 | 0.798 |
| SIXTH SPEED |   | ○ |   |   | ○ | $i_6 = 1.0$ | 1.000 | 1.000 |
| SEVENTH SPEED |   |   | ○ |   | ○ | $i_7 = 1/(1 + \rho_2)$ | 0.645 | 1.550 |
| REVERSE | ○ |   |   |   | ○ | $i_R = -(1 + \rho_1)/(\rho_3(1 + \rho_2) - \rho_1)$ | -4.255 | -0.235 |

RATIO COVERAGE: 6.357   (R/1) = 1.04

| GEAR | A | B | C | D | E | F |
|------|---|---|---|---|---|---|
| 1st  | ○ | ○ |   |   |   |   |
| 2nd  | ○ |   |   | ○ |   |   |
| 3rd  |   |   | ○ | ○ |   |   |
| 4th  |   | ○ |   | ○ |   |   |
| 5th  |   |   |   | ○ | ○ |   |
| 6th  |   | ○ |   |   | ○ |   |
| 7th  |   |   |   |   | ○ | ○ |
| 8th  |   |   | ○ |   | ○ |   |
| Rev  | ○ |   |   |   | ○ |   |

FIG.9

$\rho_{FR} = 0.5 \quad \rho_{MID} = 0.53 \quad \rho_{RR} = 0.45$

| GEAR | FORMULA OF REDUCTION GEAR RATIO | REDUCTION GEAR RATIO | 1/REDUCTION GEAR RATIO |
|---|---|---|---|
| FIRST SPEED | $i_1 = (1 + \rho_{RR} + \rho_{MID} + \rho_{MID}\rho_{FR}) / \rho_{RR}$ | 5.000 | 0.20 |
| SECOND SPEED | $i_2 = (1 + \rho_{RR}) / \rho_{RR}$ | 3.22 | 0.31 |
| THIRD SPEED | $i_3 = (\rho_{RR} + \rho_{FR} + \rho_{FR}\rho_{RR} + \rho_{MID}\rho_{FR}) / (\rho_{RR}(1 + \rho_{FR}))$ | 2.13 | 0.47 |
| FOURTH SPEED | $i_4 = (\rho_{RR} + \rho_{MID}\rho_{FR}) / \rho_{RR}$ | 1.59 | 0.63 |
| FIFTH SPEED | $i_5 = (1 + \rho_{RR}) / (1 + \rho_{RR} - \rho_{MID}\rho_{FR})$ | 1.23 | 0.81 |
| SIXTH SPEED | $i_6 = 1.0$ | 1.00 | 1.00 |
| SEVENTH SPEED | $i_7 = (1 + \rho_{RR}) / (1 + \rho_{RR} + \rho_{FR})$ | 0.74 | 1.34 |
| EIGHTH SPEED | $i_8 = 1 / (1 + \rho_{FR})$ | 0.67 | 1.50 |
| REVERSE SPEED | $i_R = -(1 + \rho_{RR}) / (\rho_{MID} + \rho_{MID}\rho_{FR} - \rho_{RR})$ | −4.12 | −0.24 |

RATIO COVERAGE: 7.50    (R/1) = 0.824

FIG.10

REDUCTION GEAR RATIO

AUTOMATIC TRANSMISSION

TECHNICAL FIELD

The present invention relates to a step automatic transmission employed as a transmission for vehicle.

BACKGROUND ART

As an automatic transmission that achieves seven forward speeds (forward speed-ratios) by using three planetary gear sets, for example, techniques disclosed in Patent Document 1 and Patent Document 2 are known. Patent Document 1 discloses an automatic transmission which achieves seven forward speeds by using six friction elements and three single-pinion-type planetary gear sets. The single-pinion-type planetary gear set has an advantage in transfer efficiency, gear noise and also durability, and does not need to reduce a diameter of pinion gear. Moreover, in the similar manner, Patent Document 2 discloses an automatic transmission which achieves six forward speeds to eight forward speeds by using five friction elements and three single-pinion-type planetary gear sets.

Patent Document 1: Japanese Patent Application Publication No. 2004-176765

Patent Document 2: U.S. Pat. No. 6,514,170, FIG. 11a, FIG. 11b

SUMMARY OF THE INVENTION

As to the technique disclosed in Patent Document 1, there is a problem that the number of friction elements is large so that an increase of the number of components and an increase of axial dimension are incurred, since at least six friction elements are necessary to achieve the seven forward speeds.

As to the technique disclosed in Patent Document 2, there is an advantage that the number of components can be reduced as compared with Patent Document 1 since the number of friction elements for achieving the six to eight forward speeds is five and is smaller than that of Patent Document 1. However, the automatic transmission shown in FIG. 11a of this Patent Document 2 cannot set a ratio between a speed ratio (reduction gear ratio) of forward first-speed and a speed ratio of reverse first-speed (Speed ratio of reverse first-speed/Speed ratio of forward first-speed: hereinafter referred to as "1-R ratio"), at an appropriate value, as shown in FIG. 11b of Patent Document 2. Accordingly, there are the following problems.

In the case that the 1-R ratio cannot be set at its appropriate value, namely for example, in a case that the 1-R ratio is a small value; an output torque relative to accelerator opening is greatly different between at the time of forward first-speed and at the time of reverse first-speed. In the case that an acceleration feel of vehicle relative to depressing adjustment of accelerator pedal is greatly different between the forward running and the reverse running, there is a problem that a drivability worsens because each of the forward first-speed and the reverse first-speed is used when starting the vehicle running. Moreover, for example, if a gear ratio is set to obtain an appreciate speed ratio of the forward first-speed, the speed ratio of reverse first-speed becomes small. In this case, sufficient torque cannot be produced at the time of reverse running unless the accelerator opening is made larger. On the other hand, if the gear ratio is set to obtain an appreciate speed ratio of the reverse first-speed, the speed ratio of the forward first-speed becomes greater than necessary so that a fuel economy and the drivability are worsened at the time of forward running which is frequently used.

It is an object of the present invention to provide an automatic transmission that can achieve seven forward speeds and/or eight forward speeds by using three simple planetary gear sets and five friction elements, and particularly, that can reduce the difference between output torque relative to depression of accelerator pedal at the time of forward first-speed and output torque relative to the depression of accelerator pedal at the time of reverse first-speed.

An automatic transmission according to one aspect of the present invention comprises: a first planetary gear set including a first rotating element, a second rotating element, and a third rotating element; a second planetary gear set including a fourth rotating element locked constantly, a fifth rotating element, and a sixth rotating element; a third planetary gear set including a seventh rotating element connected with the sixth rotating element to define a second rotating member, an eighth rotating element, and a ninth rotating element connected with the third rotating element to define a first rotating member; an input shaft constantly connected with the first rotating element; an output shaft constantly connected with the second rotating element; and at least five friction elements including a first friction element capable of locking a rotation of the eighth rotating element, a second friction element configured to selectively connect the second rotating element with the fifth rotating element, a third friction element configured to selectively connect the second rotating element with the second rotating member, a fourth friction element configured to selectively connect the fifth rotating element with the eighth rotating element, and a fifth friction element configured to selectively connect the first rotating element with the fifth rotating element, wherein the automatic transmission is configured to achieve each of at least seven forward speed-ratios and one reverse speed-ratio, by a concurrent engagement of two friction elements which are selected from the five friction elements.

DETAILED EXPLANATION OF THE INVENTION

Respective embodiments of step automatic transmission according to the present invention will be explained below.

First Embodiment

Figure 1:
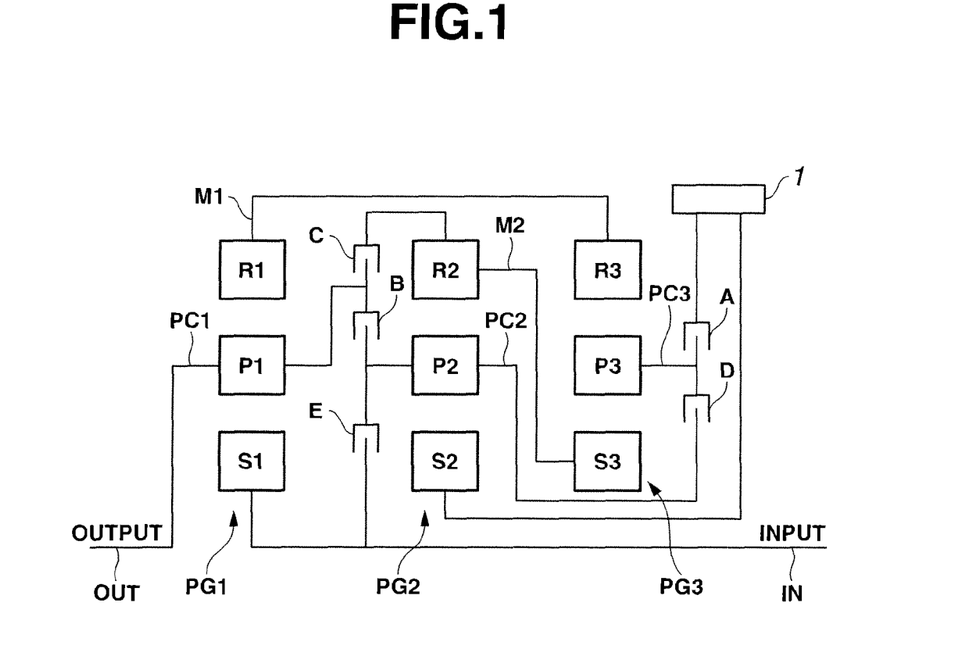
FIG. 1 A skeleton diagram showing an automatic transmission according to a first embodiment.
Figure 2:
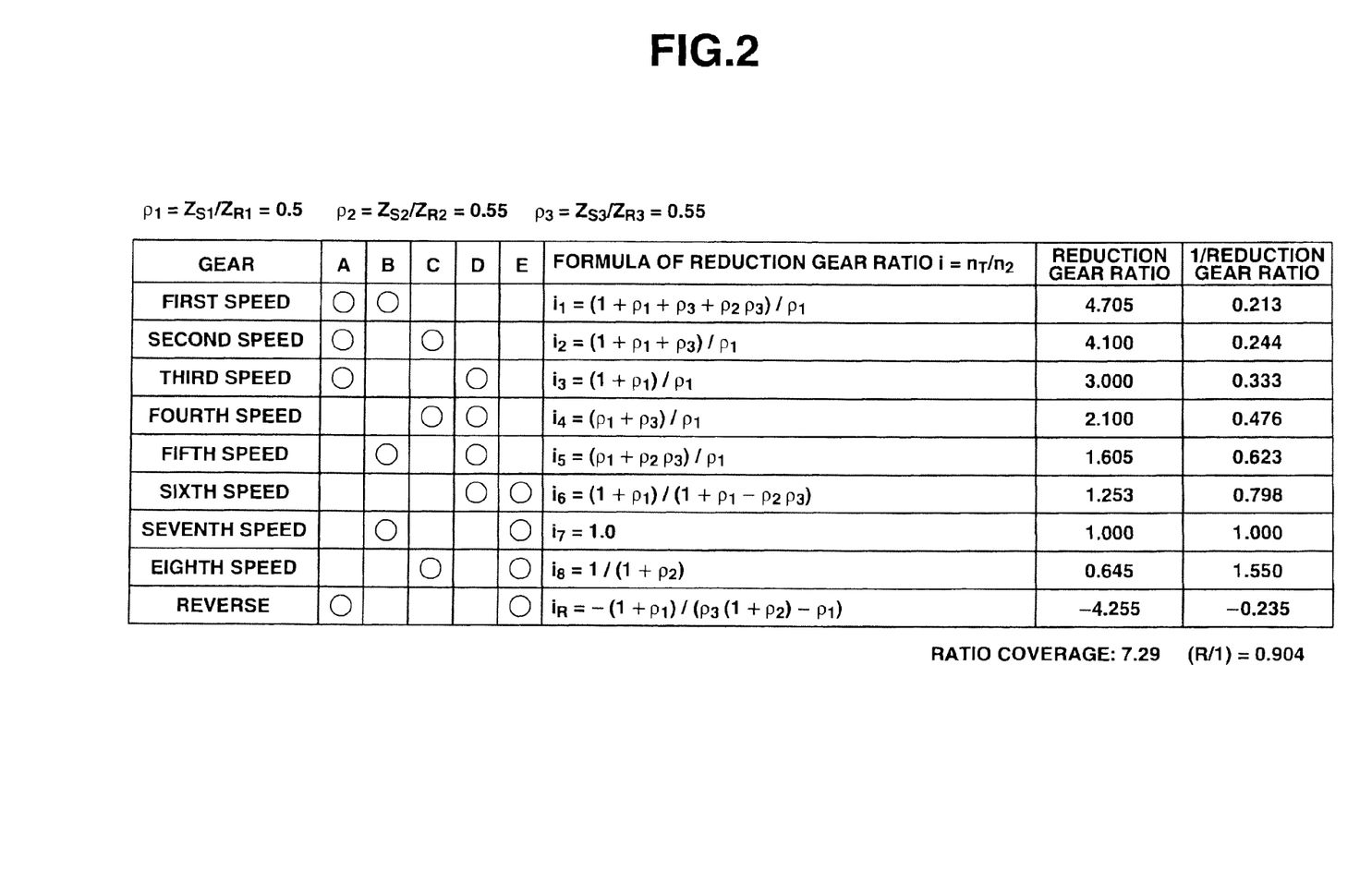
FIG. 2 A view showing a concrete example of engagement table of friction elements and their reduction gear ratios in the automatic transmission according to the first embodiment.

At first, a structure of step (multiple-step type) automatic transmission will now be explained. FIG. 1 is a skeleton diagram showing a shift mechanism of the step automatic transmission according to a first embodiment. FIG. 2 is a view showing a concrete example of engagement table of friction elements and their reduction gear ratios (speed reducing rates) in the automatic transmission according to the first embodiment.

The automatic transmission in the first embodiment includes a first planetary gear set PG1, a second planetary gear set PG2 and a third planetary gear set PG3, as a gear train, as shown in FIG. 1. Each of the three planetary gear sets PG1, PG2 and PG3 is of single-pinion type. The first planetary gear set PG1 includes a first sun gear S1, a first ring gear R1, and a first pinion P1 engaged or meshed with the first sun gear S1 and the first ring gear R1. The second planetary gear set PG2 includes a second sun gear S2, a second ring gear R2, and a second pinion P2 engaged with the second sun gear S2 and the second ring gear R2. The third planetary gear set PG3 includes a third sun gear S3, a third ring gear R3, and a third pinion P3 engaged with the third sun gear S3 and the third ring gear R3. The first, second and third pinions P1 to P3 are supported rotatably relative to a first carrier PC1, a second carrier PC2 and a third carrier PC3, respectively.

An input shaft IN is constantly connected (or engaged) with the first sun gear S1. An output shaft OUT is constantly connected with the first carrier PC1. The second sun gear S2 is constantly locked (or fixed) to a transmission case 1. The first ring gear R1 is constantly connected with the third ring gear R3 by a first rotating member M1. The second ring gear R2 is constantly connected with the third sun gear S3 by a second rotating member M2.

The automatic transmission further includes one brake which is a first friction element A, and four clutches which are second to fifth friction elements B, C, D and E. The first friction element A is provided between the third carrier PC3 and the transmission case 1, and selectively locks (stops) a rotation of the first carrier PC1 relative to the transmission case 1. The second friction element B is provided between the first carrier PC1 and the second carrier PC2, and selectively connects the first carrier PC1 with the second carrier PC2. The third friction element C is provided between the first carrier PC1 and the second ring gear R2, and selectively connects the first carrier PC1 with the second ring gear R2. The fourth friction element D is provided between the second carrier PC2 and the third carrier PC3, and selectively connects the second carrier PC2 with the third carrier PC3. The fifth friction element E is provided between the first sun gear S1 and the second carrier PC2, and selectively connects the first sun gear S1 with the second carrier PC2.

The output shaft OUT is provided with an output gear and the like to transmit rotational driving force through a differential gear and a drive shaft to a drive wheel(s), which are not shown. In the case of first embodiment, since an outer circumference of the output shaft OUT is not obstructed by the other member or the like, the automatic transmission is applicable to both of FF vehicle and FR vehicle.

The relations in engagements (connections) of the friction elements under respective gear steps (shift steps) will be explained below referring to the engagement table of FIG. 2 (these engagements for respective gear steps are attained by a shift control section or means). In the table of FIG. 2, the sign ◯ represents the engagement (engaged state), and the blank represents the disengagement (released state).

At first, the states at the time of forward running will now be explained. A first-speed (first speed-ratio) is achieved by engaging the first friction element A and the second friction element B. A second-speed is achieved by engaging the first friction element A and the third friction element C. A third-speed is achieved by engaging the first friction element A and the fourth friction element D. A fourth-speed is achieved by engaging the third friction element C and the fourth friction element D. A fifth-speed is achieved by engaging the second friction element B and the fourth friction element D. A sixth-speed is achieved by engaging the fourth friction element D and the fifth friction element E. A seventh-speed is achieved by engaging the second friction element B and the fifth friction element E. An eighth-speed is achieved by engaging the third friction element C and the fifth friction element E. Next, a reverse-speed is achieved by engaging the first friction element A and the fifth friction element E.

Next, a concrete example of the reduction gear ratios according to the first embodiment will now be explained referring to FIG. 2. The following explanations are given in the case where a gear ratio $\rho_1 = Z_{S1}/Z_{R1}$ of the first planetary gear set PG1 is equal to 0.5 ($\rho_1 = Z_{S1}/Z_{R1} = 0.5$), a gear ratio $\rho_2 = Z_{S2}/Z_{R2}$ of the second planetary gear set PG2 is equal to 0.55 ($\rho_2 = Z_{S2}/Z_{R2} = 0.55$), and a gear ratio $\rho_3 = Z_{S3}/Z_{R3}$ of the third planetary gear set PG3 is equal to 0.55 ($\rho_3 = Z_{S3}/Z_{R3} = 0.55$). Wherein, each of $Z_{S1}$, $Z_{S2}$, $Z_{S3}$, $Z_{R1}$, $Z_{R2}$ and $Z_{R3}$ represents the number of teeth of the corresponding gear.

A reduction gear ratio $i_1$ of the first-speed in the forward running is expressed by a formula: $i_1 = (1+\rho_1+\rho_3+\rho_2\rho_3)/\rho_1$. By assigning the concrete numerical values to this formula, the reduction gear ratio $i_1$ of the forward first-speed is calculated as $i_1 = 4.705$. The inverse of reduction gear ratio $i_1$ is equal to 0.213.

A reduction gear ratio $i_2$ of the second-speed in the forward running is expressed by a formula: $i_2 = (1+\rho_1+\rho_3)\rho_1$. By assigning the concrete numerical values to this formula, the reduction gear ratio $i_2$ of the forward second-speed is calculated as $i_2 = 4.100$. The inverse of reduction gear ratio $i_2$ is equal to 0.244.

A reduction gear ratio $i_3$ of the third-speed in the forward running is expressed by a formula: $i_3 = (1+\rho_1)/\rho_1$. By assigning the concrete numerical values to this formula, the reduction gear ratio $i_3$ of the forward third-speed is calculated as $i_3 = 3.000$. The inverse of reduction gear ratio $i_3$ is equal to 0.333.

A reduction gear ratio $i_4$ of the fourth-speed in the forward running is expressed by a formula: $i_4 = (\rho_1+\rho_3)/\rho_1$. By assigning the concrete numerical values to this formula, the reduction gear ratio $i_4$ of the forward fourth-speed is calculated as $i_4 = 2.100$. The inverse of reduction gear ratio $i_4$ is equal to 0.476.

A reduction gear ratio $i_5$ of the fifth-speed in the forward running is expressed by a formula: $i_5=(\rho_1+\rho_2\rho_3)/\rho_1$. By assigning the concrete numerical values to this formula, the reduction gear ratio $i_5$ of the forward fifth-speed is calculated as $i_5=1.605$. The inverse of reduction gear ratio $i_5$ is equal to 0.623.

A reduction gear ratio $i_6$ of the sixth-speed in the forward running is expressed by a formula: $i_6=+\rho_1)/(1+\rho_1-\rho_2\rho_3)$. By assigning the concrete numerical values to this formula, the reduction gear ratio $i_6$ of the forward sixth-speed is calculated as $i_6=1.253$. The inverse of reduction gear ratio $i_6$ is equal to 0.798.

A reduction gear ratio $i_7$ of the seventh-speed in the forward running is expressed by a formula: $i_7=1.0$. Without assigning the concrete numerical values to this formula, the reduction gear ratio $i_7$ of the forward seventh-speed is equal to 1.000. The inverse of reduction gear ratio $i_7$ is equal to 1.000.

A reduction gear ratio $i_8$ of the eighth-speed in the forward running is expressed by a formula: $i_8=1/(1+\rho_2)$. By assigning the concrete numerical values to this formula, the reduction gear ratio $i_8$ of the forward eighth-speed is calculated as $i_8=0.645$. The inverse of reduction gear ratio $i_8$ is equal to 1.550.

A reduction gear ratio $i_R$ of the reverse-speed is expressed by a formula: $i_R=-(1+\rho_1)/(\rho_3(1+\rho_2)-\rho_1)$. By assigning the concrete numerical values to this formula, the reduction gear ratio $i_R$ of the reverse-speed is calculated as $i_R=-4.255$. The inverse of reduction gear ratio $i_R$ is equal to $-0.235$.

Advantageous Effects According to the First Embodiment

Effects by Virtue of Structural Skeleton as a Whole

In the first embodiment, the automatic transmission capable of attaining the eight speeds of forward running and the one speed of reverse running can be realized with proper reduction gear ratios ensured; although the automatic transmission is constructed by a limited number of simple constructional elements, namely, the three simple planetary gear sets and the five friction elements.

Effects by Virtue of the Usage of Three Simple Planetary Gear Sets

Because of the usage of three sets of simple planet gears (three single-pinion-type planetary gear sets), a gear noise and a transfer efficiency can be improved as compared to the case where double pinions (double-pinion-type planetary gear set) are used. Further, because a diameter of the pinion does not need to be reduced in this embodiment, a gear durability is improved.

Effects Based on Gear Ratios

All of the gear ratios $\rho 1$, $\rho 2$ and $\rho 3$ in the respective planetary gear sets are close to a center value 0.5. Accordingly, a possible range which is obtained by freely setting the three gear ratios is wide so that a degree of freedom in reduction gear ratio can become higher.

Effects Based on Reduction Gear Ratio

In this embodiment, the reduction gear ratio of eighth-speed is intentionally set at a small value. In other words, a ratio between the reduction gear ratio of seventh-speed and the reduction gear ratio of eighth-speed (a ratio of the reduction gear ratio of seventh-speed to the reduction gear ratio of eighth-speed) is set to be larger than any other ratio between the reduction gear ratios of adjacent two speeds. Accordingly, a rotational speed of internal combustion engine can be remarkably reduced when running substantially at a constant speed with low torque, for example, when running on an express highway. Thereby, a quietness property and the fuel economy can be improved.

Effects Based on a Ratio Coverage in the Forward Running

A ratio coverage (gear-ratio width) of the forward running is defined as a value obtained by dividing the reduction gear ratio of lowest-speed (lowest shift step) by the reduction gear ratio of highest-speed (highest shift step), i.e., Reduction gear ratio of lowest-speed/Reduction gear ratio of highest-speed. It can be mentioned that a compatibility between an accelerating performance at the time of vehicle start and a fuel economy at the time of high speed cruise of vehicle becomes better, and also a degree of freedom to set the gear ratio value under respective forward speeds becomes higher; as a value of the ratio coverage becomes greater. As concrete numerical values in the first embodiment, the reduction gear ratio of the forward first-speed is equal to 4.705 and the reduction gear ratio of the forward eighth-speed is equal to 0.645. In this embodiment, the ratio coverage from first-speed to eighth-speed is equal to 7.29, and hence a sufficient ratio coverage can be ensured. Therefore, for example, the automatic transmission according to the first embodiment is useful also as a transmission for a vehicle equipped with a diesel engine as its power source, although a width of rotational speed of diesel engine is narrower than that of a gasoline engine and a torque of diesel engine is higher than that of a gasoline engine having the same engine displacement.

Effects Based on 1-R Ratio

A value of the 1-R ratio is near 1, concretely, equal to 0.904. Accordingly, an acceleration feel of vehicle relative to a depressing adjustment of accelerator pedal does not greatly vary between at the time of forward running and at the time of reverse running. Therefore, the problem that the drivability worsens can be avoided.

Effects Based on the Number of Changeovers Among Friction Elements at the Time of Shift If one or more friction element is released and two or more friction elements are engaged at the time of shift, or if two or more friction elements are released and one or more friction element is engaged at the time of shift; a torque control and a control for the engaging and releasing timings of friction elements become complicated. Hence, from a viewpoint of avoidance of the complication of shift control, it is preferable that one friction element is released and another friction element is engaged at the time of shift. That is, it is preferable that a so-called double-changeover is avoided. In the first embodiment, the shifts among the forward first-speed to the forward third-speed are performed under the condition where the first friction element A is maintained in engaged state. Moreover, the shifts among the forward third-speed to the forward sixth-speed are performed under the condition where the fourth friction element D is maintained in engaged state. Moreover, the shifts among the forward sixth-speed to the forward eighth-speed are performed under the condition where the fifth friction element E is maintained in engaged state. That is, each shift between adjacent two gear steps (adjacent two speed ratios) among the forward first-speed to eighth-speed can be achieved by releasing one friction element and by engaging one friction element. Moreover, each one-step-skip shift (one-ratio-skip shift) among the forward first-speed to eighth-speed can be achieved by releasing one friction element and by engaging one friction element. Accordingly, each of all the adjacent shifts and all the one-step-skip shifts in the forward running is performed by means of the changeover from one friction element to the other one friction element. Therefore, the control during the shift can be prevented from being complicated.

Effects Based on Layout (i) In the automatic transmission according to the first embodiment, the first and fourth friction elements A and D are disposed intensively (collectively) on an input-shaft side of the three planetary gear sets, as shown in the skeleton diagram of FIG. 1. In the same manner, the second, third and fifth friction elements B, C and E are intensively disposed. That is, engaging pressures and the like need to be supplied to the respective clutches and brake, and oil supply passages for these engaging pressures have to be provided from fixed members as a matter of course. Since the respective friction elements are intensively arranged in this embodiment, a distance from a fixed wall formed with oil passages to each friction element can be approximately equalized or shortened. Accordingly, the routing of oil passages is easy with a superior controllability.

(ii) Moreover, the rotating member passing on the outer peripheral (outer circumferential) side of the planetary gear sets is only the first rotating member M1, namely, is formed in a single-layered structure, as shown by the skeleton diagram of FIG. 1. Generally in the automatic transmission, lubricating oil is always supplied to respective rotating elements such as gears, bearings and the like for the purpose of cooling or lubrication. This lubricating oil is generally supplied from a shaft-center side of the transmission by means of centrifugal force. At this time, if an efficiency of discharge (retrieving performance) of lubricating oil becomes worsened on the outer peripheral side of the planetary gear sets, oil temperature rises so that a durability of friction elements, bearing members (not shown) and the like is lowered. Since the rotating member passing on the outer peripheral side of the planetary gear sets forms the single-layered structure in the first embodiment as mentioned above, the discharging efficiency of lubricating oil is not worsened so that the temperature rise is suppressed to improve the durability.

(iii) The automatic transmission according to the first embodiment can be designed to allow torque to be inputted to one side of the planetary gear sets and then to be outputted from another side of the planetary gear sets. Accordingly, the automatic transmission according to the first embodiment is applicable to both of the front-wheel drive vehicle (hereinafter referred to as, FF vehicle) and the rear-wheel drive vehicle (hereinafter referred to as, FR vehicle), namely, can be widely applied.

First Modified Example

Next, a first modified example of the first embodiment according to the present invention will now be explained. Since a basic structure of the first modified example is the same as that of the pre-modified example explained above, only structural parts of the first modified example which are different from the above pre-modified example are now explained.

Figure 3:
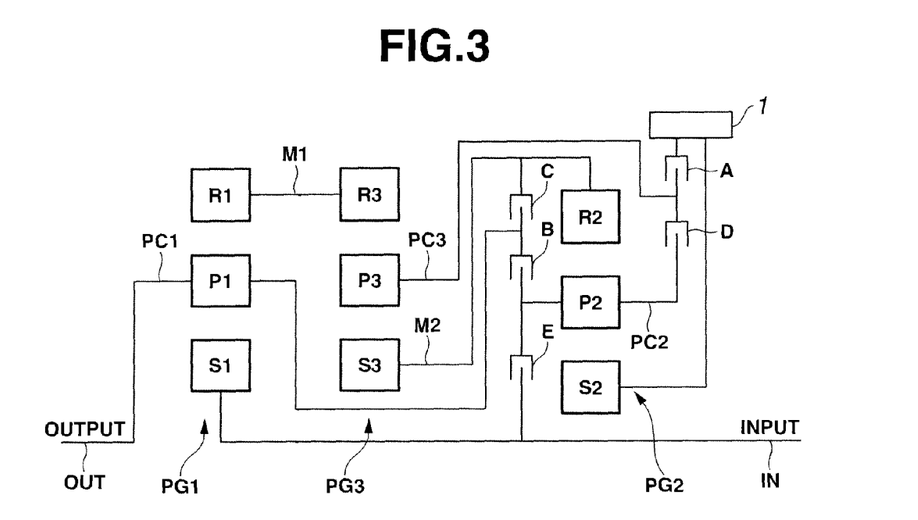
FIG. 3 A skeleton diagram showing a first modified example of the first embodiment.

FIG. 3 is a skeleton diagram showing the first modified example. In the above pre-modified example, the three single-pinion-type planetary gear sets of the first planetary gear set PG1, the second planetary gear set PG2 and the third planetary gear set PG3 as the gear train are disposed in this order from the output side (the first planetary gear set PG1→the second planetary gear set PG2→the third planetary gear set PG3). Contrary to this, in the first modified example, the three planetary gear sets are disposed in order as the first planetary gear set PG1→the third planetary gear set PG3→the second planetary gear set PG2 from the output side.

All of the positional relations of respective friction elements, the connecting relations of respective rotating members, and the engagement relations of friction elements under the respective shift steps are the same as those of the pre-modified example. In other words, between the pre-modified example and the first modified example, the locations of second planetary gear set PG2 and third planetary gear set PG3 are simply replaced with each other. Therefore, in the first modified example, the following advantageous effects can be obtained in addition to the effects mentioned in the pre-modified example of the first embodiment.

Advantageous Effects According to First Modified Example

In the first modified example, there is no member passing on the outer peripheral side of planetary gear set which is located in the output side of automatic transmission, namely, there is no member passing on the outer circumferential side of first planetary gear set PG1. Accordingly, a diameter of output side of the automatic transmission can be reduced. This reduction of output-side diameter remarkably improves a mounting property to a vehicle, particularly in the case of usage as a transmission for the FR vehicle.

Second Modified Example

Next, a second modified example of the first embodiment will now be explained. Since a basic structure of the second modified example is the same as that of the above pre-modified example of the first embodiment, only structural parts of the second modified example which are different from the pre-modified example are now explained.

Figure 4:
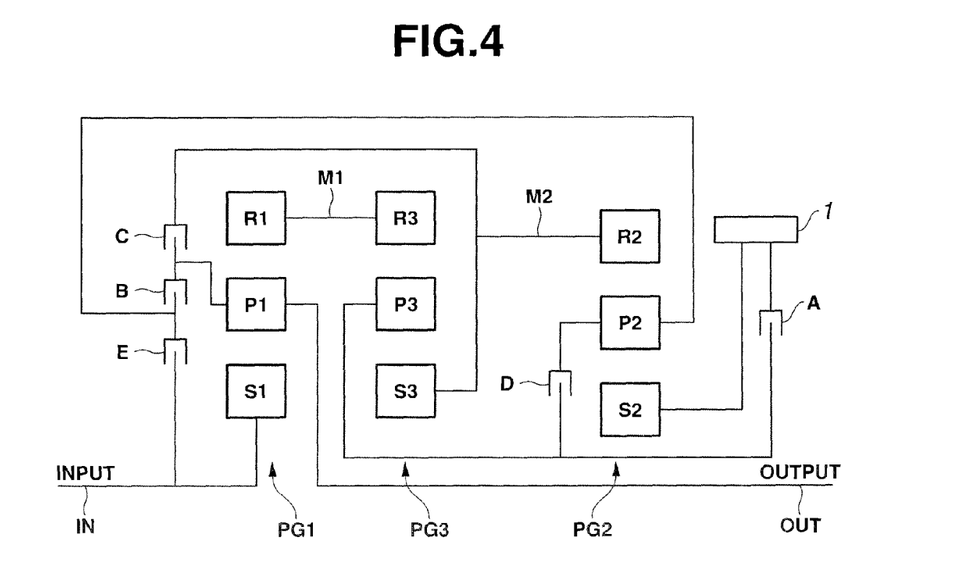
FIG. 4 A skeleton diagram showing an automatic transmission according to a second modified example of the first embodiment.

FIG. 4 is a skeleton diagram showing the second modified example. In the above pre-modified example, the three single-pinion-type planetary gear sets of the first planetary gear set PG1, the second planetary gear set PG2 and the third planetary gear set PG3 as the gear train are disposed in this order from the output-shaft side (the first planetary gear set PG1→the second planetary gear set PG2→the third planetary gear set PG3). Contrary to this, in the second modified example, the three planetary gear sets are disposed in order as the second planetary gear set PG2→the third planetary gear set PG3→the first planetary gear set PG1 from the output side. Although the alignment order in the second modified example is the similar as that in the first modified example, the engagement elements B, C and E are provided on an input-shaft side beyond the first planetary gear set PG1, unlike the first modified example. It is noted that FIG. 4 shows positions of the input shaft and the output shaft in a manner opposite to that of FIG. 1 in the pre-modified example.

All of the positional relations of respective friction elements, the connecting relations of respective rotating members, and the engagement relations of friction elements under the respective shift steps are the same as those in the pre-modified example. Also in this second modified example, the effects similar as those mentioned in the pre-modified example of the first embodiment can be obtained.

Second Embodiment

Next, a second embodiment according to the present invention will now be explained. In the second embodiment, seven speeds in the forward running and one speed in the reverse running are attained by employing the automatic transmission of the pre-modified example of first embodiment.

Figure 5:
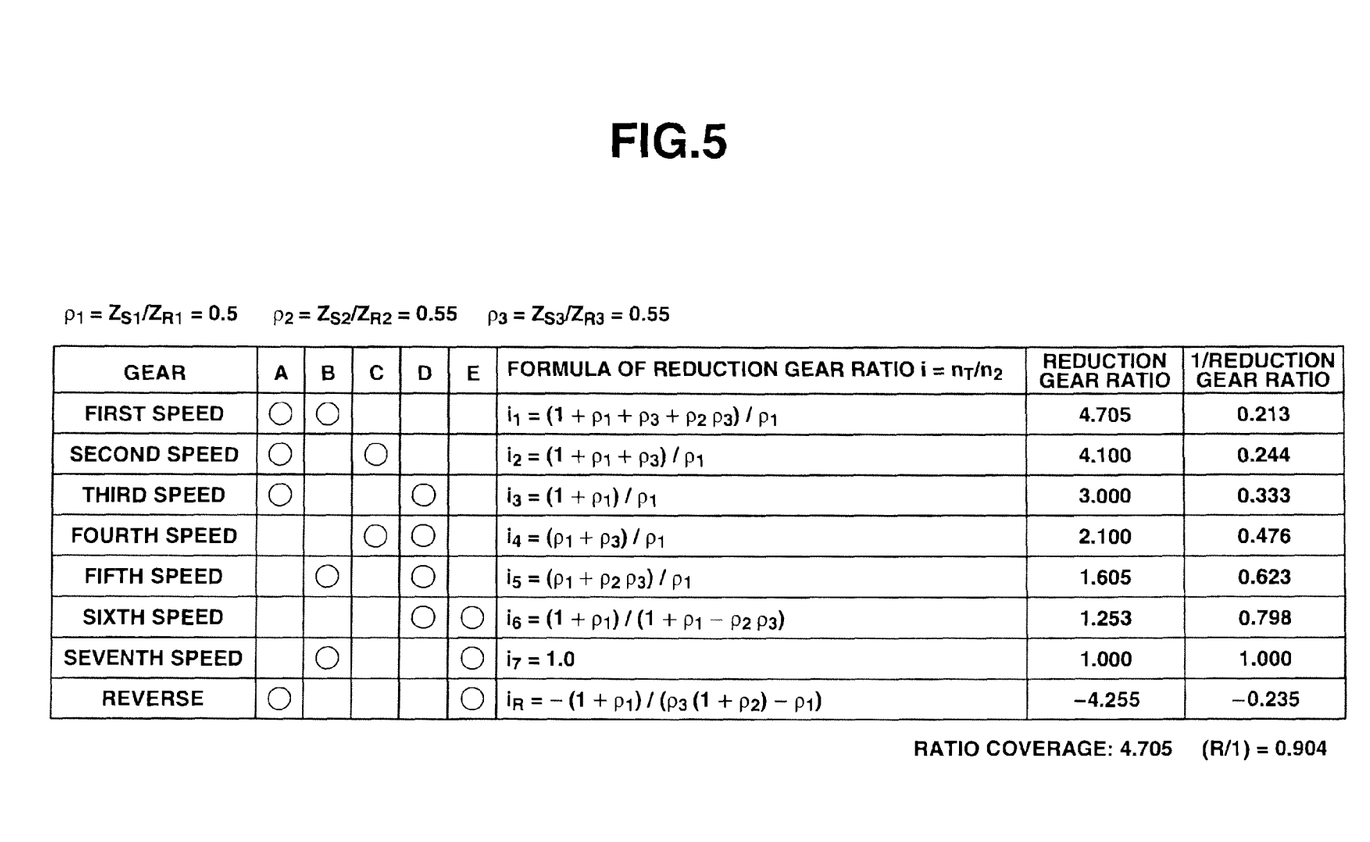
FIG. 5 A view showing a concrete example of engagement table of friction elements and their reduction gear ratios in an automatic transmission according to a second embodiment.

The relations in engagements (connections) of the friction elements under respective gear steps will be explained below referring to the engagement table of FIG. 5 (these engagements for respective gear steps are attained by a shift control section or means). In the table of FIG. 5, the sign ○ represents the engagement, and the blank represents the disengagement.

At first, the states at the time of forward running will now be explained. A first-speed is achieved by engaging the first friction element A and the second friction element B. A second-speed is achieved by engaging the first friction element A and the third friction element C. A third-speed is achieved by engaging the first friction element A and the fourth friction element D. A fourth-speed is achieved by engaging the third friction element C and the fourth friction element D. A fifth-speed is achieved by engaging the second friction element B and the fourth friction element D. A sixth-speed is achieved by engaging the fourth friction element D and the fifth friction element E. A seventh-speed is achieved by engaging the second friction element B and the fifth friction element E. A reverse-speed is achieved by engaging the first friction element A and the fifth friction element E.

The ratio coverage in the second embodiment is equal to 4.705, and the 1-R ratio is equal to 0.904. Accordingly, the advantageous effects similar as the first embodiment can be obtained. However, the effects based on the ratio coverage are reduced as compared with the first embodiment, because the ratio coverage in the second embodiment is smaller than that of the first embodiment. Moreover, since the eighth-speed as shown in the first embodiment does not exist, the above-mentioned effects based on the reduction gear ratio cannot be obtained. It is noted that the second embodiment may be attained by using the structure shown in the first modified example of first embodiment.

Third Embodiment

Next, a third embodiment according to the present invention will now be explained. In the third embodiment, seven speeds in the forward running and one speed in the reverse running are attained by employing the automatic transmission of the pre-modified example of first embodiment.

Figure 6:
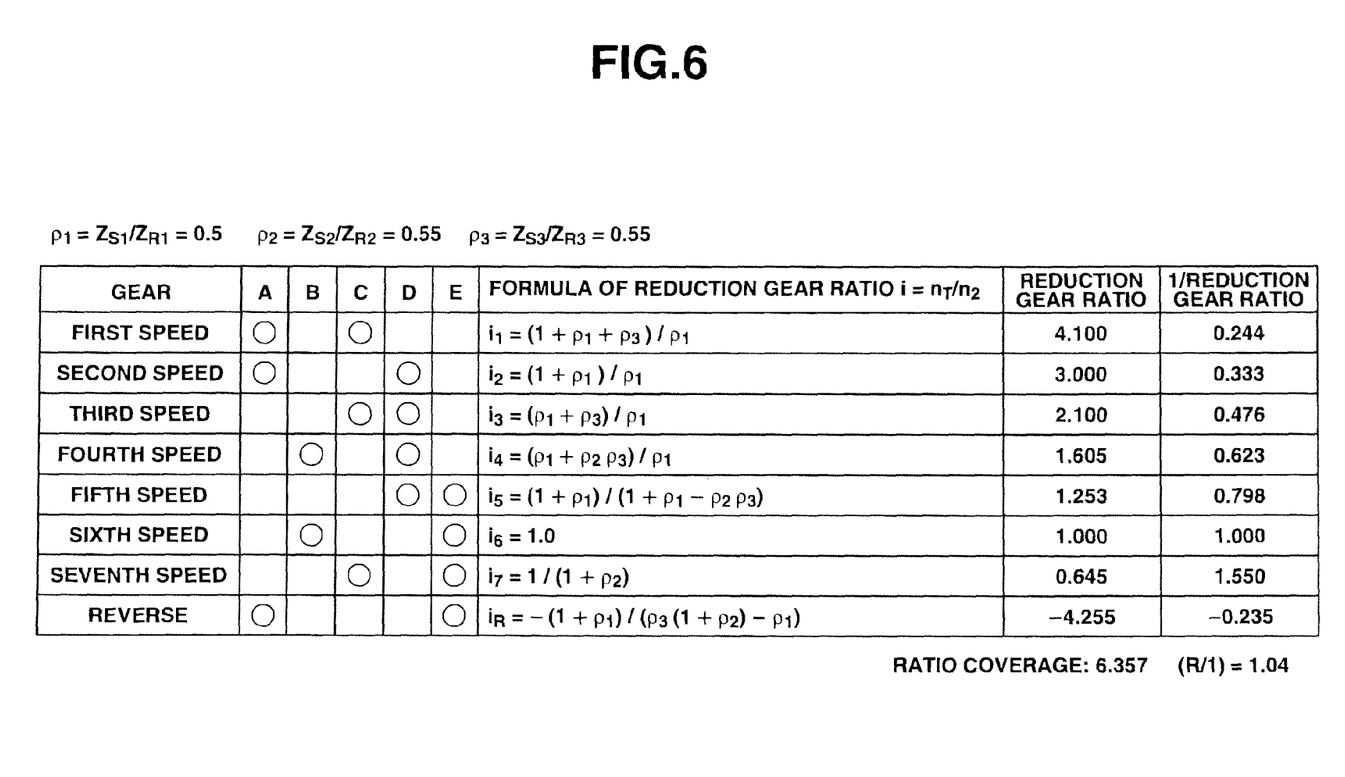
FIG. 6 A view showing a concrete example of engagement table of friction elements and their reduction gear ratios in an automatic transmission according to a third embodiment.

The relations in engagements (connections) of the friction elements under respective gear steps will be explained below referring to the engagement table of FIG. 6 (these engagements are attained by a shift control section or means). In the table of FIG. 6, the sign ○ represents the engagement, and the blank represents the disengagement.

At first, the states at the time of forward running will now be explained. A first-speed is achieved by engaging the first friction element A and the third friction element C. A second-speed is achieved by engaging the first friction element A and the fourth friction element D. A third-speed is achieved by engaging the third friction element C and the fourth friction element D. A fourth-speed is achieved by engaging the second friction element B and the fourth friction element D. A fifth-speed is achieved by engaging the fourth friction element D and the fifth friction element E. A sixth-speed is achieved by engaging the second friction element B and the fifth friction element E. A seventh-speed is achieved by engaging the third friction element C and the fifth friction element E. A reverse-speed is achieved by engaging the first friction element A and the fifth friction element E.

The ratio coverage in the third embodiment is equal to 6.357, and the 1-R ratio is equal to 1.04. Accordingly, the advantageous effects similar as the first embodiment can be obtained. However, the effects based on the ratio coverage are reduced as compared with the first embodiment, because the ratio coverage in the third embodiment is smaller than that of the first embodiment. Moreover, since the 1-R ratio of this embodiment is closer to 1 than that of the first embodiment, the effects based on the 1-R ratio is great as compared with the first embodiment. It is noted that the third embodiment may be attained by using the structure shown in the first modified example of first embodiment.

Fourth Embodiment

Figure 7:
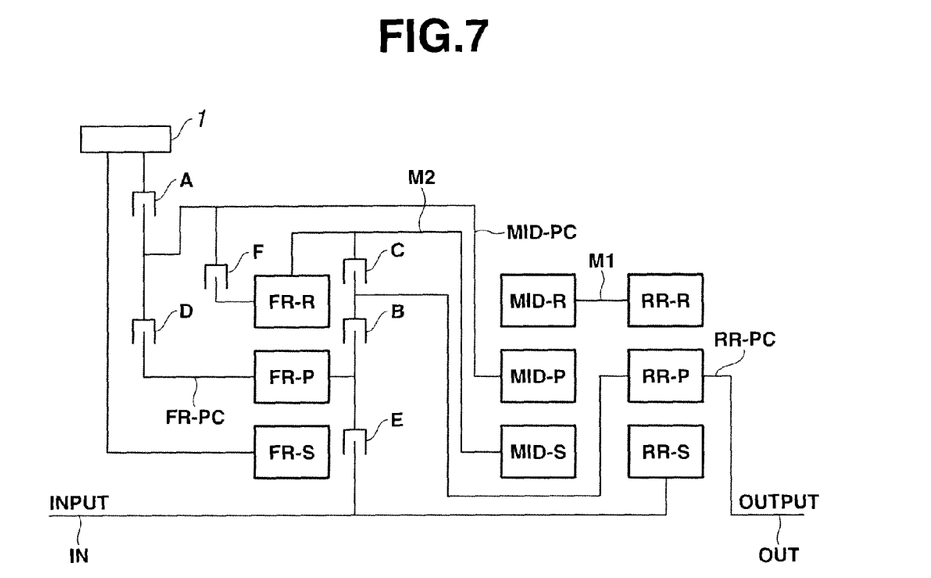
FIG. 7 A skeleton diagram showing an automatic transmission according to a fourth embodiment.
Figure 8:
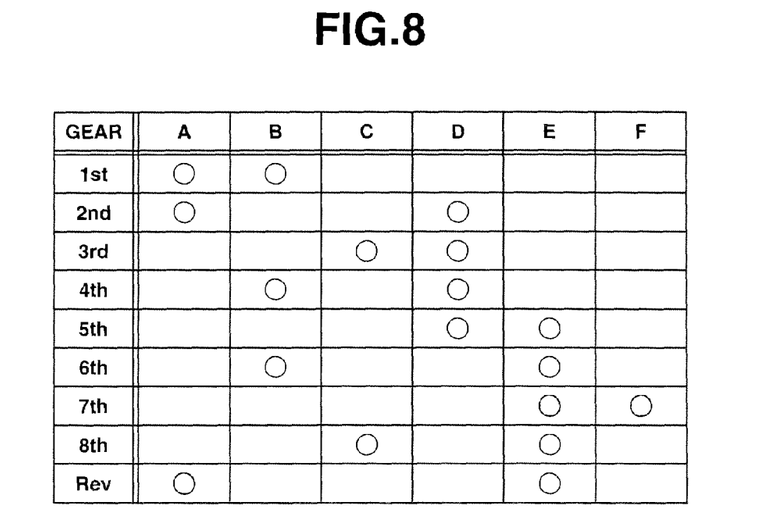
FIG. 8 A view showing an engagement table of friction elements in the automatic transmission according to the fourth embodiment.
Figure 9:
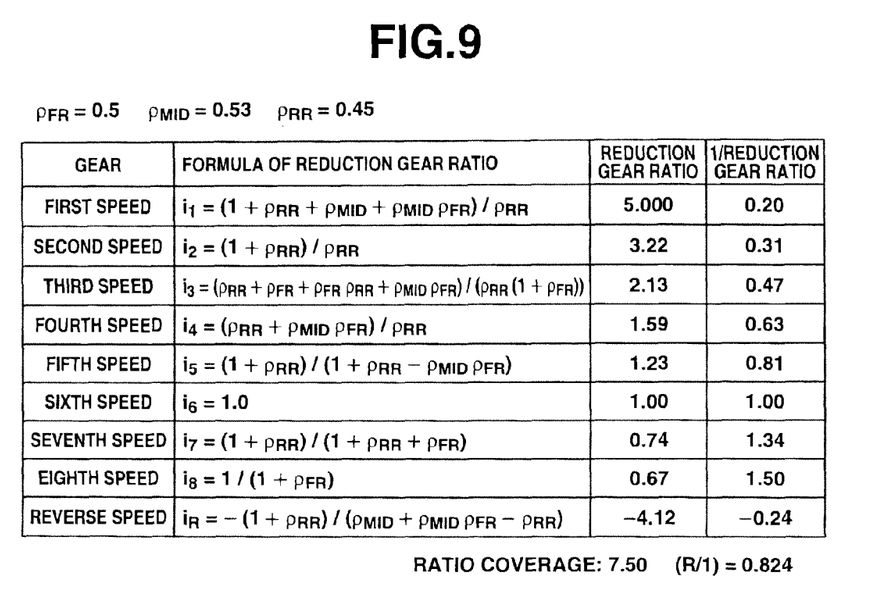
FIG. 9 A view showing a concrete example of the reduction gear ratios in the automatic transmission according to the fourth embodiment.
Figure 10:
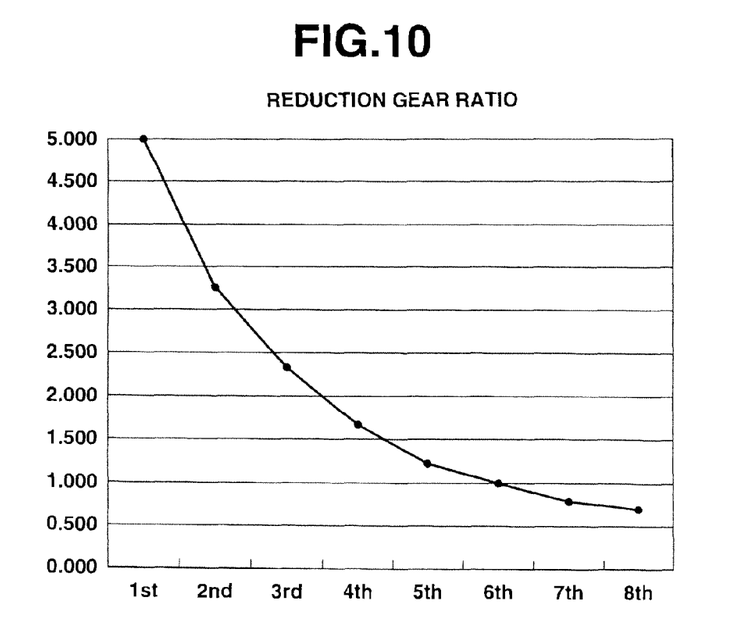
FIG. 10 A map of reduction gear ratio in which the reduction gear ratios for respective forward speeds are plotted, in the automatic transmission according to the fourth embodiment.

At first, a structure will now be explained. FIG. 7 is a skeleton diagram showing a shift mechanism of the step automatic transmission according to the fourth embodiment. FIG. 8 is an engagement table of friction elements in the automatic transmission according to the fourth embodiment. FIG. 9 is a concrete example of the reduction gear ratios. FIG. 10 is a map of reduction gear ratio in which the reduction gear ratios for respective forward speeds are plotted.

The automatic transmission in the fourth embodiment includes a front planetary gear set PGFR (first planetary gear set), a mid planetary gear set PGMID (second planetary gear set) and a rear planetary gear set PGRR (third planetary gear set), as a gear train, as shown in FIG. 7. Each of the three planetary gear sets PGFR, PGMID and PGRR is of single-pinion type. The front planetary gear set PGFR includes a front sun gear FR-S (first rotating element), a front ring gear FR-R (third rotating element), and a front pinion FR-P engaged or meshed with the front sun gear FR-S and the front ring gear FR-R. The mid planetary gear set PGMID includes a mid sun gear MID-S (fourth rotating element), a mid ring gear MID-R (sixth rotating element), and a mid pinion MID-P engaged with the mid sun gear MID-S and the mid ring gear MID-R. The rear planetary gear set PGRR includes a rear sun gear RR-S (seventh rotating element), a rear ring gear RR-R (ninth rotating element), and a rear pinion RR-P engaged with the rear sun gear RR-S and the rear ring gear RR-R. The front pinion FR-P, the mid pinion MID-P and the rear pinion RR-P are supported rotatably relative to a front carrier FR-PC (second rotating element), a mid carrier MID-PC (fifth rotating element) and a rear carrier RR-PC (eighth rotating element), respectively.

An input shaft IN is constantly connected (or engaged) with the rear sun gear RR-S. An output shaft OUT is constantly connected with the rear carrier RR-PC. The front sun gear FR-S is constantly locked or fixed to a transmission case 1. The mid ring gear MID-R is constantly connected with the rear ring gear RR-R by a first rotating member M1. The front ring gear FR-R is constantly connected with the mid sun gear MID-S by a second rotating member M2.

The automatic transmission further includes one brake which is a first friction element (low-and-reverse brake) A, and five clutches which are a second friction element (146 clutch) B, a third friction element (38 clutch) C, a fourth friction element (mid clutch) D, a fifth friction element (high-and-reverse clutch) E and a sixth friction element (7 clutch) F.

The first friction element A is provided between the mid carrier MID-PC and the transmission case 1, and selectively locks (stops) a rotation of the mid carrier MID-PC relative to the transmission case 1. The second friction element B is provided between the front carrier FR-PC and the rear carrier RR-PC, and selectively connects the front carrier FR-PC with the rear carrier RR-PC. The third friction element C is provided between the front ring gear FR-R and the rear carrier RR-PC, and selectively connects the front ring gear FR-R with the rear carrier RR-PC. The fourth friction element D is provided between the front carrier FR-PC and the mid carrier MID-PC, and selectively connects the front carrier FR-PC with the mid carrier MID-PC. The fifth friction element E is provided between the front carrier FR-PC and the rear sun gear RR-S, and selectively connects the front carrier FR-PC with the rear sun gear RR-S. The sixth friction element F is provided between the front ring gear FR-R and the mid carrier MID-PC, and selectively connects the front ring gear FR-R with the mid carrier MID-PC.

The output shaft OUT is provided with an output gear and the like to transmit rotational driving force through a differential gear and a drive shaft to a drive wheel(s), which are not shown. In the case of fourth embodiment, since an outer circumference of the output shaft OUT is not obstructed by the other member or the like, the automatic transmission in this embodiment is applicable to both of the FF vehicle and FR vehicle.

The relations in engagements (connections) of the friction elements under respective gear steps will be explained below referring to the engagement table of FIG. 8 (these engagements for respective gear steps are attained by a shift control section or means). In the table of FIG. 8, the sign ○ represents the engagement, and the blank represents the disengagement.

At first, the states at the time of forward running will now be explained. A first-speed is achieved by engaging the first friction element A and the second friction element B. A second-speed is achieved by engaging the first friction element A and the fourth friction element D. A third-speed is achieved by engaging the third friction element C and the fourth friction element D. A fourth-speed is achieved by engaging the second friction element B and the fourth friction element D. A fifth-speed is achieved by engaging the fourth friction element D and the fifth friction element E. A sixth-speed is achieved by engaging the second friction element B and the fifth friction element E. A seventh-speed is achieved by engaging the fifth friction element E and the sixth friction element F. An eighth-speed is achieved by engaging the third friction element C and the fifth friction element E. A reverse-speed is achieved by engaging the first friction element A and the fifth friction element E.

Next, a concrete example of the reduction gear ratios according to the fourth embodiment will now be explained referring to FIG. 9. The following explanations are given in the case where a gear ratio $\rho_{FR}=Z_{FR-S}/Z_{FR-R}$ of the front planetary gear set PGFR is equal to 0.50 ($\rho_{FR}=Z_{FR-S}/Z_{FR-R}=0.50$), a gear ratio $\rho_{MID}=Z_{MID-S}/Z_{MID-R}$ of the mid planetary gear set PGMID is equal to 0.53 ($\rho_{MID}=Z_{MID-S}/Z_{MID-R}=0.53$), and a gear ratio $\rho_{RR}=Z_{RR-S}/Z_{RR-R}$ of the rear planetary gear set PGRR is equal to 0.45 ($\rho_{RR}=Z_{RR-S}/Z_{RR-R}=0.45$). Wherein, each of $Z_{FR-S}$, $Z_{MID-S}$, $Z_{RR-S}$, $Z_{FR-R}$, $Z_{MID-R}$ and $Z_{RR-R}$ represents the number of teeth of the corresponding gear.

A reduction gear ratio $i_1$ of the first-speed in the forward running is expressed by a formula: $i_1=(1+\rho_{RR}+\rho_{MID}+\rho_{MID}\rho_{FR})/\rho_{RR}$. By assigning the concrete numerical values to this formula, the reduction gear ratio $i_1$ of the forward first-speed is calculated as $i_1=5.00$. The inverse of reduction gear ratio $i_1$ is equal to 0.20.

A reduction gear ratio $i_2$ of the second-speed in the forward running is expressed by a formula: $i_2=(1+\rho_{RR})/\rho_{RR}$. By assigning the concrete numerical values to this formula, the reduction gear ratio $i_2$ of the forward second-speed is calculated as $i_2=3.22$. The inverse of reduction gear ratio $i_2$ is equal to 0.31.

A reduction gear ratio $i_3$ of the third-speed in the forward running is expressed by a formula: $i_3=(\rho_{RR}+\rho_{FR}+\rho_{FR}\rho_{RR}+\rho_{MID}\rho_{FR})/(\rho_{RR}(1+\rho_{FR}))$. By assigning the concrete numerical values to this formula, the reduction gear ratio $i_3$ of the forward third-speed is calculated as $i_3=2.13$. The inverse of reduction gear ratio $i_3$ is equal to 0.47.

A reduction gear ratio $i_4$ of the fourth-speed in the forward running is expressed by a formula: $i_4=(\rho_{RR}+\rho_{MID}\rho_{FR})/\rho_{RR}$. By assigning the concrete numerical values to this formula, the reduction gear ratio $i_4$ of the forward fourth-speed is calculated as $i_4=1.59$. The inverse of reduction gear ratio $i_4$ is equal to 0.63.

A reduction gear ratio $i_5$ of the fifth-speed in the forward running is expressed by a formula: $i_5=(1+\rho_{RR})/(1+\rho_{RR}-\rho_{MID}\rho_{FR})$. By assigning the concrete numerical values to this formula, the reduction gear ratio $i_5$ of the forward fifth-speed is calculated as $i_5=1.23$. The inverse of reduction gear ratio $i_5$ is equal to 0.81.

A reduction gear ratio $i_6$ of the sixth-speed in the forward running is expressed by a formula: $i_6=1.0$. Without assigning the concrete numerical values to this formula, the reduction gear ratio $i_6$ of the forward sixth-speed is equal to 1.0. The inverse of reduction gear ratio $i_6$ is equal to 1.0.

A reduction gear ratio $i_7$ of the seventh-speed in the forward running is expressed by a formula: $i_7=(1+\rho_{RR})/(1+\rho_{RR}\rho_{FR})$. By assigning the concrete numerical values to this formula, the reduction gear ratio $i_7$ of the forward seventh-speed is calculated as $i_7=0.74$. The inverse of reduction gear ratio $i_7$ is equal to 1.34.

A reduction gear ratio $i_8$ of the eighth-speed in the forward running is expressed by a formula: $i_8=1/(1+\rho_{FR})$. By assigning the concrete numerical values to this formula, the reduction gear ratio $i_8$ of the forward eighth-speed is calculated as $i_8=0.67$. The inverse of reduction gear ratio $i_8$ is equal to 1.50.

A reduction gear ratio $i_R$ of the reverse-speed is expressed by a formula: $i_R=-(1+\rho_{RR})/(\rho_{MID}+\rho_{MID}\rho_{FR}-\rho_{RR})$. By assigning the concrete numerical values to this formula, the reduction gear ratio $i_R$ of the reverse-speed is calculated as $i_R=-4.12$. The inverse of reduction gear ratio $i_R$ is equal to $-0.24$.

FIG. 10 is a map of reduction gear ratio in which the reduction gear ratios for respective forward speeds are plotted. As shown in FIG. 10, the reduction gear ratio decreases in geometric progression as the shift step increases to a High-speed side. Accordingly, rhythmical shifts are attained without a feeling of strangeness when the shifts according to vehicle speed are conducted.

Advantageous Effects According to the Fourth Embodiment

Effects Based on Integrated Dragging Speed Rate

A rate of relative rotational speed of a released friction element to an input rotational speed of transmission is defined as a dragging speed rate (a parameter representing a magnitude of the relative rotational speed with respect to a magnitude of the input rotational speed, by regarding the magnitude of input rotational speed as "1"). The dragging speed rates of respective friction elements which are in released state are integrated every shift step. Hereinafter, this integrated value under each shift step is referred to as "integrated dragging speed rate". The integrated dragging speed rate can be used for evaluating the degree of relative rotational speeds of friction elements in the transmission, every shift step. Generally, right or wrong of fuel economy can be roughly judged by using this integrated dragging speed rate, because a loss horsepower of friction element tends to increase as its relative rotational speed becomes higher. Particularly, this tendency becomes pronounced in a case that the input rotational speed is relatively low, or in a case that the number of brakes is large among the friction elements which are in released state.

Figure 11:
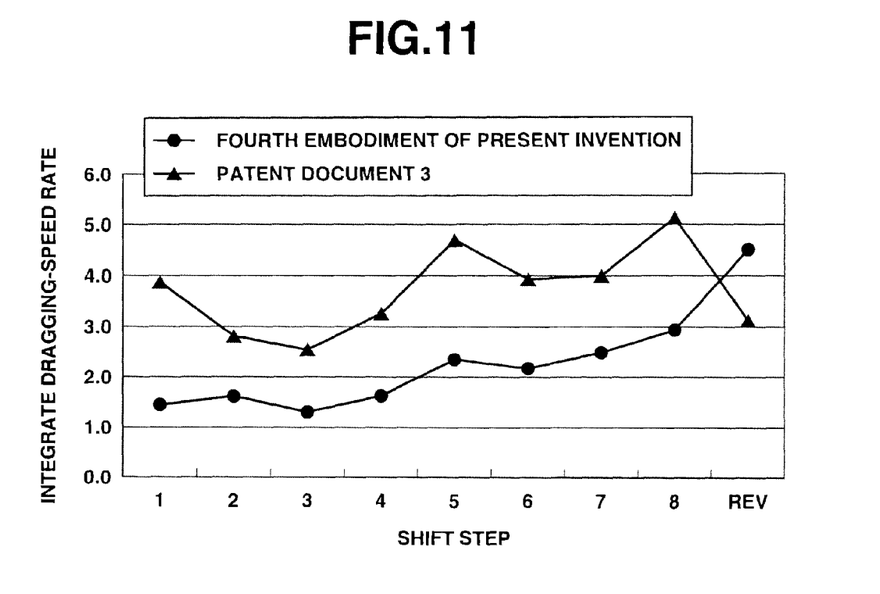
FIG. 11 A view showing integrated dragging speed rates in respective shift steps according the fourth embodiment and Patent Document 3.

As a comparative example, in a case of automatic transmission disclosed in Patent Document 3 (WO2005/026579, see FIG. 3), the integrated dragging speed rate has been calculated every shift step by regarding respective gear ratios of the three rows of planetary gear sets as $\alpha1=0.463$, $\alpha2=0.459$ and $\alpha3=0.405$. FIG. 11 is a view showing the integrated dragging speed rates in respective shift steps. As shown by signs ▲ of FIG. 11, in the case of automatic transmission disclosed in Patent Document 3, there is a problem that the integrated dragging speed rate is high so as to worsen the fuel economy at the time of forward shift steps which are frequently used.

As shown by signs ● of FIG. 11, in the case of automatic transmission according to the fourth embodiment of the present invention, the integrated dragging speed rate is low as compared with the case of Patent Document 3 at the time of forward shift steps which are frequently used. Accordingly, the fuel economy can be improved mainly in a low-speed region.

Effects by Virtue of Structural Skeleton as a Whole

In the fourth embodiment, the automatic transmission capable of attaining the eight speeds of forward running and the one speed of reverse running can be realized with proper reduction gear ratios ensured; although the automatic transmission is constructed by a limited number of simple constructional elements, namely, the three simple planetary gear sets and the six friction elements.

Effects by Virtue of the Usage of Three Simple Planetary Gear Sets

Because of the usage of three simple planetary gear sets, a degradation of gear noise can be suppressed as compared with the case where double pinions (double-pinion-type planetary gear set) are used. Further, because a diameter of the pinion does not need to be reduced in this embodiment, a degradation of gear durability can be suppressed. Moreover, outer diameter of the planetary gear set can be reduced so that a diameter of transmission can be downsized.

Effects Based on Gear Ratios

All of the gear ratios $\rho1$, $\rho2$ and $\rho3$ of the respective planetary gear sets are close to a center value 0.5. Accordingly, a possible range which is obtained by freely setting the three gear ratios is wide so that a degree of freedom in reduction gear ratio can be made high.

Effects Based on Ratio Coverage in the Forward Running

A ratio coverage (gear-ratio width) of the forward running is defined as a value obtained by dividing the reduction gear ratio of the lowest-speed (step) by the reduction gear ratio of the highest-speed (step), i.e., Reduction gear ratio of lowest-speed/Reduction gear ratio of highest-speed. It can be mentioned that a degree of freedom to set the gear ratio values for respective forward speeds becomes higher as a value of the ratio coverage becomes greater. As concrete numerical values in the fourth embodiment, the reduction gear ratio of the forward first-speed is equal to 5.00 and the reduction gear ratio of the forward eighth-speed is equal to 0.67. In this embodiment, the ratio coverage from first-speed to eighth-speed is equal to 7.50, and hence a sufficient ratio coverage can be ensured. Therefore, for example, the automatic transmission according to the fourth embodiment is useful also as a transmission for a vehicle equipped with a diesel engine as its power source, although a width of rotational speed of diesel engine is narrower than that of a gasoline engine and a torque of diesel engine is higher than that of a gasoline engine having the same engine displacement.

Effects Based on 1-R Ratio

A ratio of the reduction gear ratio of reverse first-speed to the reduction gear ratio of forward first-speed (Reduction gear ratio of reverse first-speed/Reduction gear ratio of forward first-speed: which will be hereinafter referred to as "1-R ratio") is near 1, concretely, equal to 0.824. Accordingly, an acceleration feel of vehicle relative to a depressing adjustment of accelerator pedal does not greatly vary between at the time of forward running and at the time of reverse running. Therefore, the problem that the drivability worsens can be avoided.

Supplemental explanations about the 1-R ratio will now be described. In a case that the 1-R ratio cannot be set at a proper value, namely for example, in a case that the 1-R ratio is small value; output torque relative to an accelerator opening is greatly different between the forward first-speed and the reverse first-speed. In the case that the acceleration feel of vehicle relative to the depressing adjustment of accelerator pedal is greatly different between at the time of forward running and at the time of reverse running, there is the problem that the drivability worsens because each of the forward first-speed and the reverse first-speed is used at the time of running start of vehicle. From this view point, the 1-R ratio has been introduced as one indicator of the drivability.

Effects Based on the Number of Changeovers Among the Friction Elements at the Time of Shift If one or more friction element is released and two or more friction elements are engaged at the time of shift, or if two or more friction elements are released and one or more friction element is engaged at the time of shift; a torque control and a control for the engaging and releasing timings of friction elements become complicated. Hence, from a viewpoint of avoidance of the complication of shift control, it is preferable that one friction element is released and one friction element is engaged at the time of shift. That is, it is preferable that so-called double-changeover is avoided. In the fourth embodiment, the shifts between the forward first-speed and the forward second-speed are performed under the condition where the first friction element A is maintained in engaged state. Moreover, the shifts among the forward second-speed to the forward fifth-speed are performed under the condition where the fourth friction element D is maintained in engaged state. Moreover, the shifts among the forward fifth-speed to the forward eighth-speed are performed under the condition where the fifth friction element E is maintained in engaged state. That is, each shift between adjacent two gear steps among the forward first-speed to eighth-speed can be achieved (by means of a changeover shift conducted) by releasing one friction element and by engaging one friction element. Moreover, each one-step-skip shift among the forward first-speed to eighth-speed (except the one-step-skip shift from the forward first-speed to the forward third-speed) can be achieved by releasing one friction element and by engaging one friction element. Therefore, the control during the shift can be prevented from being complicated.

Effects Based on Layout (i) In the automatic transmission according to the fourth embodiment, the first friction element A, the fourth friction element D and the sixth friction elements F are disposed intensively on an input-shaft side of the three planetary gear sets, as shown in the skeleton diagram of FIG. 7. In the same manner, the second friction element B, the third friction element C and the fifth friction element E are intensively disposed. That is, engaging pressures and the like need to be supplied to the respective clutches and brake, and oil supply passages for these engaging pressures have to be provided from fixed members as a matter of course. Since the respective friction elements are intensively arranged in this embodiment, a distance from a fixed wall formed with oil passages to each friction element can be approximately equalized or shortened. Accordingly, the routing of oil passages is easy with a superior controllability.

Particularly, oil pump and the like which are driven by the engine are generally provided on the input side of transmission. Hence, an oil-pump cover and the like for supporting the oil pump are disposed on the input side. Since the oil-pump cover is provided to enclose the transmission case 1 on the input side, this cover is useful as communication passages between a control valve unit and the respective rotating elements. Since the friction elements are intensively arranged on the input side in the fourth embodiment, it is easy to use this cover and the like so that the routing of oil passages is easier.

(ii) Moreover, the rotating member passing on the outer peripheral side of the planetary gear sets is only a rotating member that rotates integrally with the mid carrier MID-PC, namely is formed in a single-layered structure, as shown by the skeleton diagram of FIG. 7. Generally in the automatic transmission, lubricating oil is always supplied to respective rotating elements such as gears and bearings for the purpose of cooling or lubrication. This lubricating oil is generally supplied from a shaft-center side of the transmission by means of centrifugal force. At this time, if an efficiency of discharge of lubricating oil becomes worsened on the outer peripheral side of the planetary gear sets, oil temperature rises so that a durability of friction elements, bearing members (not shown) and the like is lowered. Since the rotating member passing on the outer peripheral side of the planetary gear sets forms the single-layered structure in the fourth embodiment as mentioned above, the discharging efficiency of lubricating oil is not worsened so that the temperature rise is suppressed to enhance the durability.

(iii) Moreover, in this embodiment, there is no member passing on the outer peripheral side of planetary gear set which is located in the output side of automatic transmission. Accordingly, a diameter of output side of automatic transmission can be reduced. Accordingly, this diameter reduction of output side remarkably improves a mounting property to vehicle particularly when the transmission is mounted in a rear-wheel drive vehicle.

(iv) The automatic transmission according to the fourth embodiment can be designed to allow torque to be inputted to one side of the planetary gear sets and then to be outputted from another side of the planetary gear sets. Accordingly, the automatic transmission according to the fourth embodiment is applicable to both of the front-wheel drive vehicle and the rear-wheel drive vehicle, namely can be widely applied.

Fifth Embodiment

Next, a fifth embodiment according to the present invention will now be explained. Since a basic structure of the fifth embodiment is the same as that of the fourth embodiment, only structural parts of the fifth embodiment which are different from the fourth embodiment are now explained.

Figure 12:
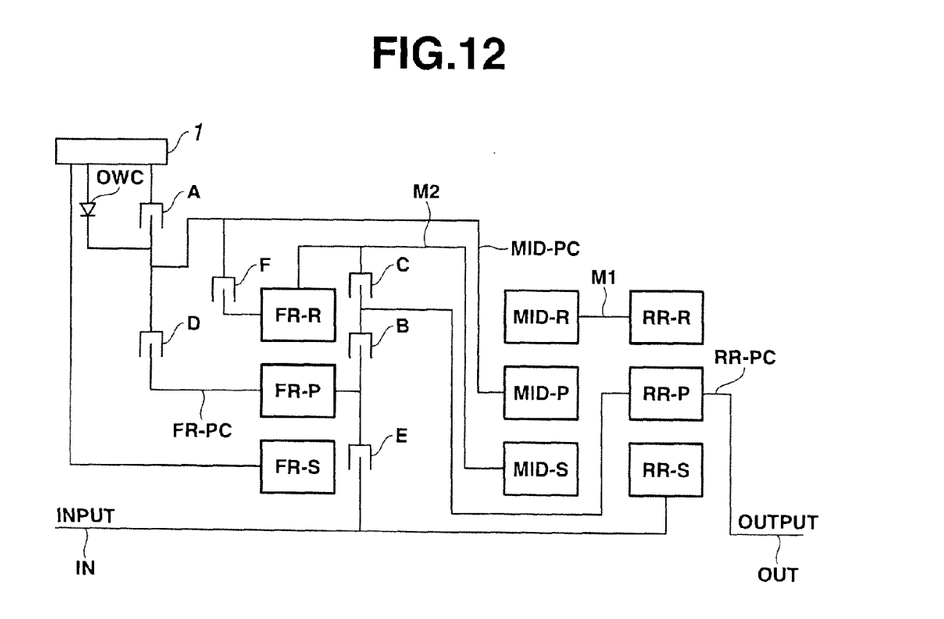
FIG. 12 A skeleton diagram showing an automatic transmission according to a fifth embodiment.

FIG. 12 is a skeleton diagram showing the fifth embodiment. In the fifth embodiment, a one-way clutch OWC is provided in parallel with the first friction element A. In order to eliminate excessive feeling of engine brake during a normal running or in order to simplify the shift control during an upshift accompanying great torque difference such as an upshift between low-side shift steps, it is preferable that a one-way dutch OWC for low-side shift step is provided.

For such purposes, in the case of fourth embodiment, the one-way clutch OWC for low-side shift step should be provided in parallel with the first friction element A which is released at the time of upshift from the forward second-speed to the forward third-speed. The first friction element A is a brake which selectively locks the mid carrier MID-PC to the transmission case 1. This mid carrier MID-PC rotates in a positive direction (a rotational direction of engine is defined as the positive direction) at the time of shift from the second-speed to the third-speed. Accordingly, in order to install one-way dutch OWC in parallel with the first friction element A, it is necessary that the rotational direction of mid carrier MID-PC is the positive direction under all the shift steps placing the first friction element A in the released state.

In case that the rotational direction of mid carrier MID-PC becomes a negative direction under any shift step, it is necessary that one more friction element capable of switching between active and inactive states of this one-way clutch OWC is added in series with the one-way clutch OWC. In such a case, the increase of the number of components is incurred so that the usefulness of installation of one-way clutch OWC becomes relatively low. In the fourth embodiment according to the present invention, it is recognized that the rotation of mid carrier MID-PC is maintained in the positive direction under all the shift steps, by checking the rotational speeds (each number of revolutions) of the mid carrier MID-PC under all the shift steps. Therefore, in the case of structure of the fourth embodiment, just only by providing the one-way clutch OWC in parallel with the first friction element A; the simplification of control logic can be achieved without greatly increasing the number of components, and the excessive feeling of engine brake can be suppressed during the normal running of vehicle.

In this fifth embodiment, the first friction element A is set in the engaged state under the first-speed and the second-speed. Hence, at the time of coasting downshift or the like, a downshift from the third-speed to the second-speed and a downshift from the second-speed to the first-speed can be conducted in the state where the first friction element A is maintained in the released state. In this case, only the releasing control of third friction element C is carried out at the time of downshift from the third-speed to the second-speed, and the releasing control of fourth friction element D and the engaging control of second friction element B are carried out at the time of downshift from the second-speed to the first-speed.

In addition to the above explanations as to the fourth and fifth embodiments, the engagement relations of rotating elements of respective planetary gear sets may employ the other engagement relations according to the present invention. Moreover, although the planetary gear sets are arranged in the manner as Front→Mid→Rear in the fourth embodiment, this order of arrangement may be appropriately changed according to the present invention.

The invention claimed is:
1. An automatic transmission comprising:
a first planetary gear set including a first rotating element, a second rotating element, and a third rotating element;
a second planetary gear set including a fourth rotating element locked constantly stationary, a fifth rotating element, and a sixth rotating element;
a third planetary gear set including a seventh rotating element constantly connected with the sixth rotating element to define a second rotating member, an eighth rotating element, and a ninth rotating element constantly connected with the third rotating element to define a first rotating member;
an input shaft constantly connected with the first rotating element;
an output shaft constantly connected with the second rotating element; and
at least five friction elements including a first friction element capable of locking a rotation of the eighth rotating element in a stationary position, a second friction element configured to selectively connect the second rotating element with the fifth rotating element, a third fric- tion element configured to selectively connect the second rotating element with the second rotating member, a fourth friction element configured to selectively connect the fifth rotating element with the eighth rotating element, and a fifth friction element configured to selectively connect the first rotating element with the fifth rotating element, wherein the automatic transmission is configured to achieve each of at least seven forward speed-ratios and one reverse speed-ratio, by a concurrent engagement of two friction elements which are selected from the five friction elements.

2. The automatic transmission as claimed in claim 1, wherein the first rotating element, the fourth rotating element and the seventh rotating element are sun gears;

the second rotating element, the fifth rotating element and the eighth rotating element are carriers; and the third rotating element, the sixth rotating element and the ninth rotating element are ring gears.

3. The automatic transmission as claimed in claim 1, wherein the seven forward speed-ratios are achieved by at least seven states selected from a concurrent engagement of the first friction element and the second friction element, a concurrent engagement of the first friction element and the third friction element, a concurrent engagement of the first friction element and the fourth friction element, a concurrent engagement of the third friction element and the fourth friction element, a concurrent engagement of the second friction element and the fourth friction element, a concurrent engagement of the fourth friction element and the fifth friction element, a concurrent engagement of the second friction element and the fifth friction element, and a concurrent engagement of the third friction element and the fifth friction element; and the one reverse speed-ratio is achieved by a concurrent engagement of the first friction element and the fifth friction element.

4. The automatic transmission as claimed in claim 1, wherein the automatic transmission further comprises a sixth friction element configured to selectively connect two of the rotating elements included in the third planetary gear set, with each other; and the automatic transmission is configured to achieve each of at least eight forward speed-ratios and one reverse speed-ratio, by a concurrent engagement of two friction elements which are selected from the six friction elements.

5. The automatic transmission as claimed in claim 4, wherein the concurrent engagement of two friction elements which are selected from the six friction elements is one of a concurrent engagement of the first friction element and the second friction element, a concurrent engagement of the first friction element and the fourth friction element, a concurrent engagement of the third friction element and the fourth friction element, a concurrent engagement of the second friction element and the fourth friction element, a concurrent engagement of the fourth friction element and the fifth friction element, a concurrent engagement of the second friction element and the fifth friction element, a concurrent engagement of the fifth friction element and the sixth friction element and a concurrent engagement of the third friction element and the fifth friction element, in the case of forward speed-ratio; and the concurrent engagement of two friction elements which are selected from the six friction elements is a concurrent engagement of the first friction element and the fifth friction element, in the case of reverse speed-ratio.

6. The automatic transmission as claimed in claim 2, wherein the seven forward speed-ratios are achieved by at least seven states selected from a concurrent engagement of the first friction element and the second friction element, a concurrent engagement of the first friction element and the third friction element, a concurrent engagement of the first friction element and the fourth friction element, a concurrent engagement of the third friction element and the fourth friction element, a concurrent engagement of the second friction element and the fourth friction element, a concurrent engagement of the fourth friction element and the fifth friction element, a concurrent engagement of the second friction element and the fifth friction element, and a concurrent engagement of the third friction element and the fifth friction element; and the one reverse speed-ratio is achieved by a concurrent engagement of the first friction element and the fifth friction element.

7. The automatic transmission as claimed in claim 2, wherein the automatic transmission further comprises a sixth friction element configured to selectively connect two of the rotating elements included in the third planetary gear set, with each other; and the automatic transmission is configured to achieve each of at least eight forward speed-ratios and one reverse speed-ratio, by a concurrent engagement of two friction elements which are selected from the six friction elements.

* * * * *